(12) United States Patent
Endara

(10) Patent No.: US 10,948,115 B2
(45) Date of Patent: Mar. 16, 2021

(54) DEVICE FOR REEL-LESS SPOOLING OF HOSES, FLEXIBLE PIPES AND CABLES

(71) Applicant: Rene Ricardo Endara, East Moriches, NY (US)

(72) Inventor: Rene Ricardo Endara, East Moriches, NY (US)

( * ) Notice: Subject to any disclaimer, the term of this patent is extended or adjusted under 35 U.S.C. 154(b) by 0 days.

(21) Appl. No.: 16/908,047

(22) Filed: Jun. 22, 2020

(65) Prior Publication Data

US 2020/0318767 A1   Oct. 8, 2020

Related U.S. Application Data

(63) Continuation of application No. 15/770,631, filed as application No. PCT/US2018/027886 on Apr. 17, 2018.

(60) Provisional application No. 62/602,293, filed on Apr. 19, 2017.

(51) Int. Cl.
*F16L 33/22*   (2006.01)
*B65H 75/36*   (2006.01)

(52) U.S. Cl.
CPC ............ *F16L 33/222* (2013.01); *B65H 75/36* (2013.01)

(58) Field of Classification Search
CPC ......... F16L 33/222; F16L 3/0402; F16L 3/10; F16L 2/20; F16L 2/22; B65H 75/36; A61M 5/1418; Y10T 24/44752; Y10T 24/14; Y10T 24/3444
See application file for complete search history.

(56) References Cited

U.S. PATENT DOCUMENTS

| | | | | |
|---|---|---|---|---|
| 2,723,431 A | * | 11/1955 | Di Renzo | ............ B65H 75/366 24/301 |
| 3,382,545 A | * | 5/1968 | Spenner | .................. F16G 11/00 24/16 R |
| 3,387,341 A | * | 6/1968 | Mates | ..................... A44B 18/00 24/306 |
| 3,437,297 A | | 4/1969 | Jirka et al. | |
| 4,407,472 A | * | 10/1983 | Beck | ....................... A62C 33/04 24/339 |
| 5,027,478 A | * | 7/1991 | Suhr | ....................... B65H 75/36 137/355.16 |
| 5,035,383 A | | 7/1991 | Rainville | |
| 5,309,604 A | * | 5/1994 | Poulsen | .............. A61M 5/1418 24/16 R |

(Continued)

*Primary Examiner* — Anita M King
(74) *Attorney, Agent, or Firm* — Carter, DeLuca & Farrell LLP; Francesco Sardone, Esq.

(57) ABSTRACT

A winding assistance device for tubular members having a first cuff including an elongate body defining a first cuff longitudinal axis, the elongate body of the first cuff having a C-shaped transverse cross-sectional profile defining a radially facing opening, where the opening of the first cuff defines a first cuff entry axis extending orthogonally from the first cuff longitudinal axis and bisecting a width of the opening of the first cuff; and a second cuff including an elongate body defining a second cuff longitudinal axis, the elongate body of the second cuff having a C-shaped transverse cross-sectional profile defining a radially facing opening therealong. The opening of the second cuff defines a second cuff entry axis extending orthogonally from the second cuff longitudinal axis and bisecting a width of the opening of the second cuff. The first cuff and the second cuff are secured to each other.

13 Claims, 20 Drawing Sheets

(56) References Cited

U.S. PATENT DOCUMENTS

| | | | | |
|---|---|---|---|---|
| 5,507,460 A * | 4/1996 | Schneider | ............ | A61M 5/1418 |
| | | | | 24/601.2 |
| 5,669,590 A | 9/1997 | Przewodek | | |
| 5,697,129 A | 12/1997 | Newville | | |
| 5,878,546 A * | 3/1999 | Westover | ................. | E04C 5/167 |
| | | | | 24/329 |
| 6,047,825 A * | 4/2000 | Samuels | ............. | A61M 25/002 |
| | | | | 206/364 |
| 6,109,569 A * | 8/2000 | Sakaida | .................. | F16L 3/222 |
| | | | | 248/316.7 |
| 6,751,382 B2 * | 6/2004 | McGarvey | .............. | F16L 3/222 |
| | | | | 174/168 |
| 7,461,741 B2 * | 12/2008 | State | ................... | A61M 25/002 |
| | | | | 206/364 |
| 7,886,406 B2 * | 2/2011 | Chang | ..................... | E05D 5/127 |
| | | | | 16/252 |
| 8,083,432 B2 * | 12/2011 | Limpert | .................. | F16L 3/237 |
| | | | | 403/389 |
| 9,155,976 B1 * | 10/2015 | Mosquera | ............ | A63H 33/082 |
| 9,534,708 B2 | 1/2017 | Cripps, II | | |
| 2014/0259620 A1 * | 9/2014 | Hicks | ...................... | F16L 3/223 |
| | | | | 29/525.01 |
| 2015/0211678 A1 * | 7/2015 | Bulka | .................... | F16M 11/06 |
| | | | | 248/229.16 |
| 2016/0016306 A1 * | 1/2016 | Haddon | .................. | B25H 5/00 |
| | | | | 211/70.6 |
| 2019/0010968 A1 * | 1/2019 | Flint | ....................... | F16L 3/223 |
| 2019/0275964 A1 * | 9/2019 | Adachi | .............. | B60R 16/0215 |

* cited by examiner

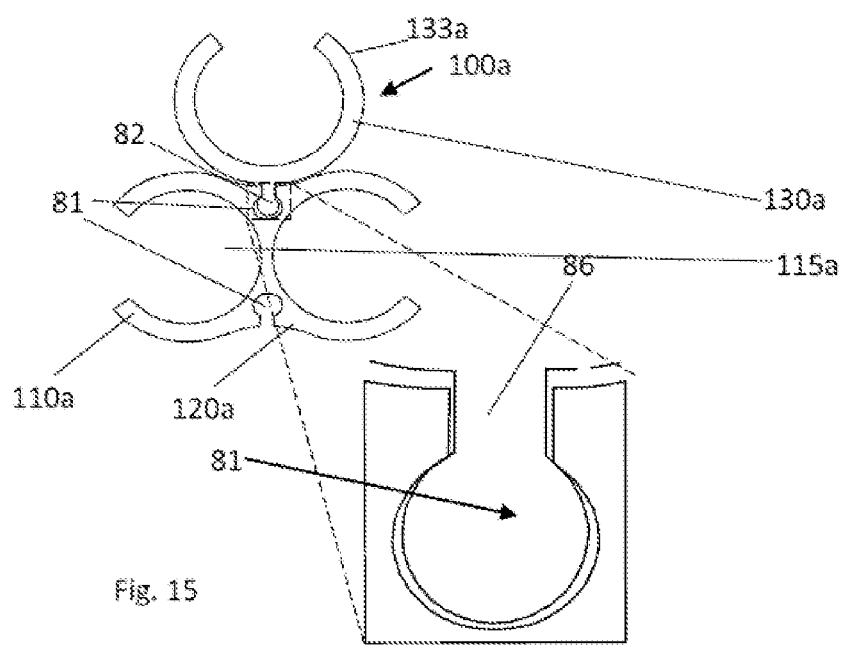

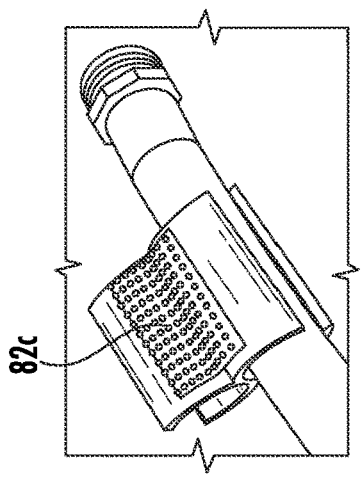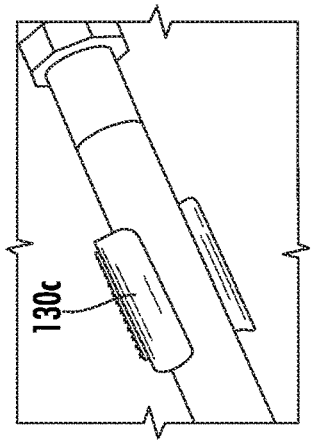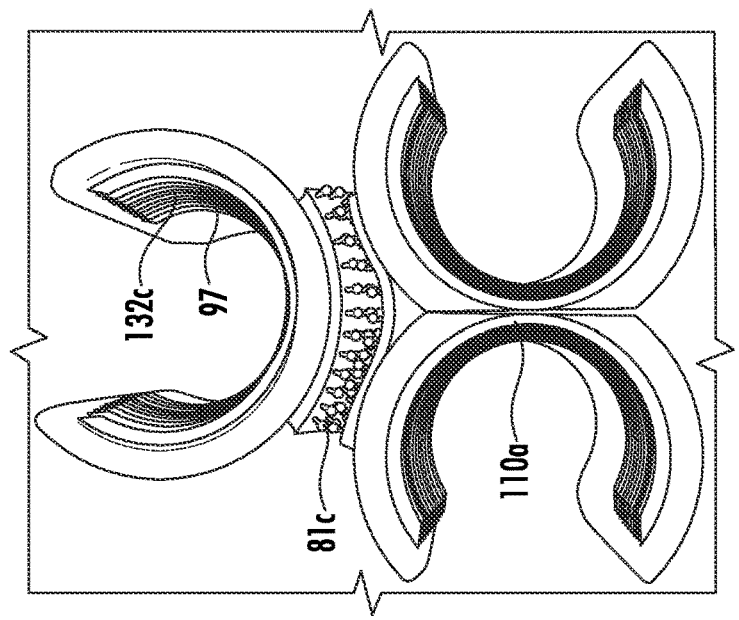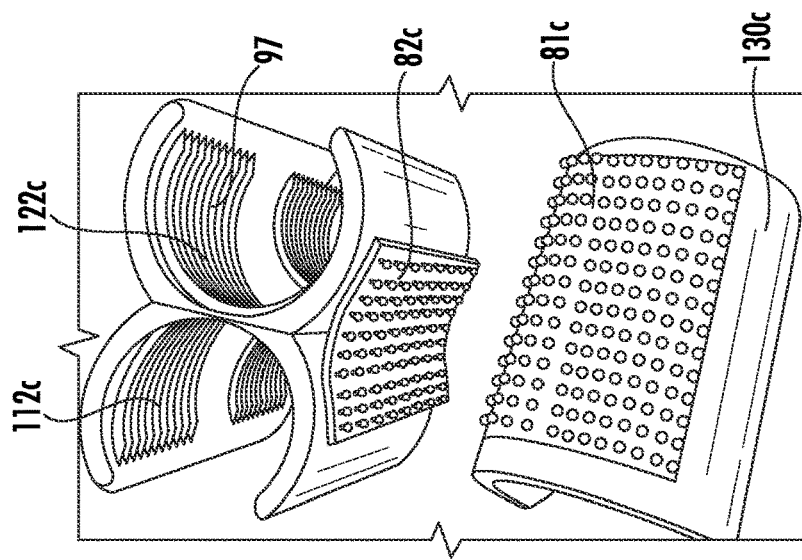

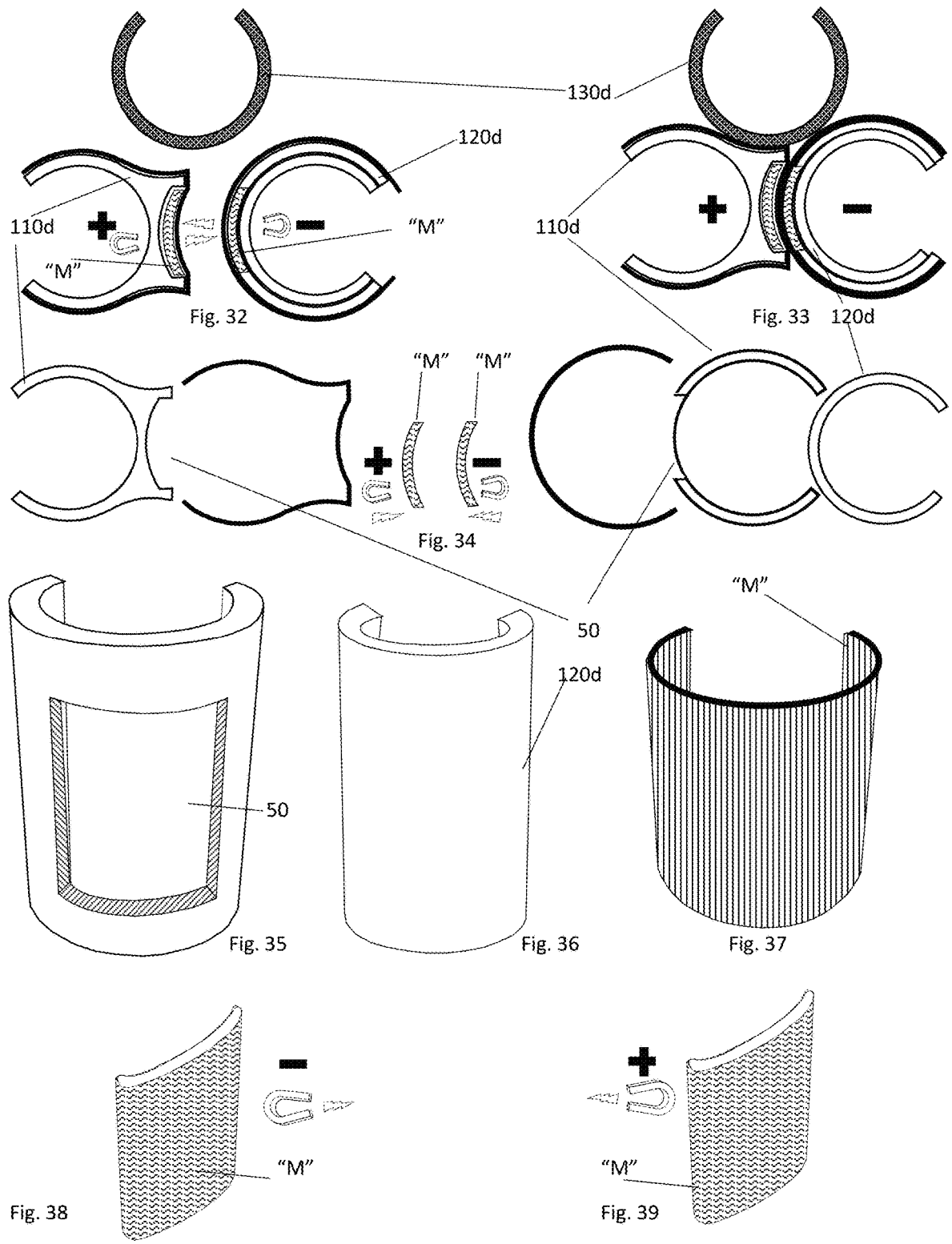

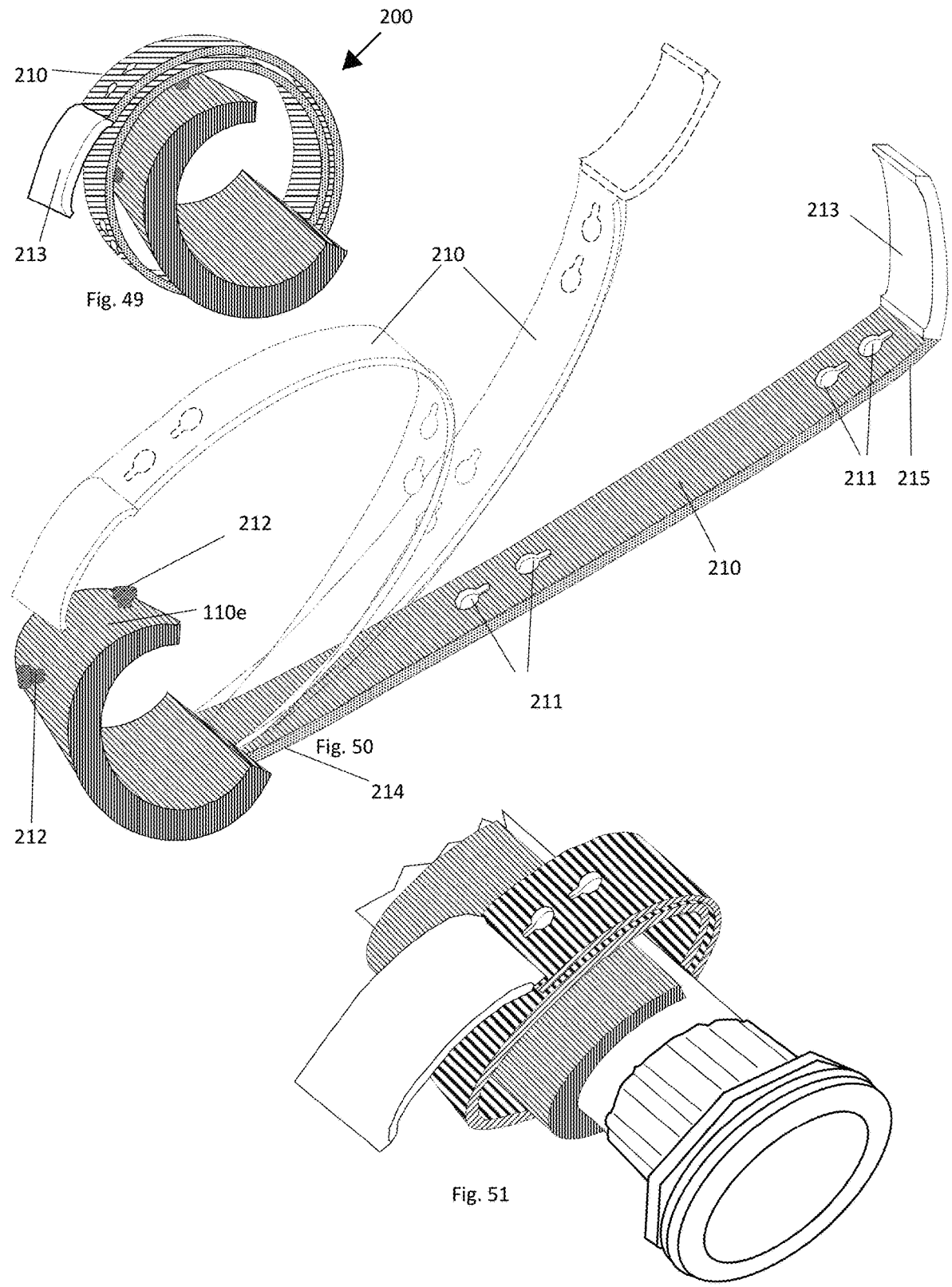

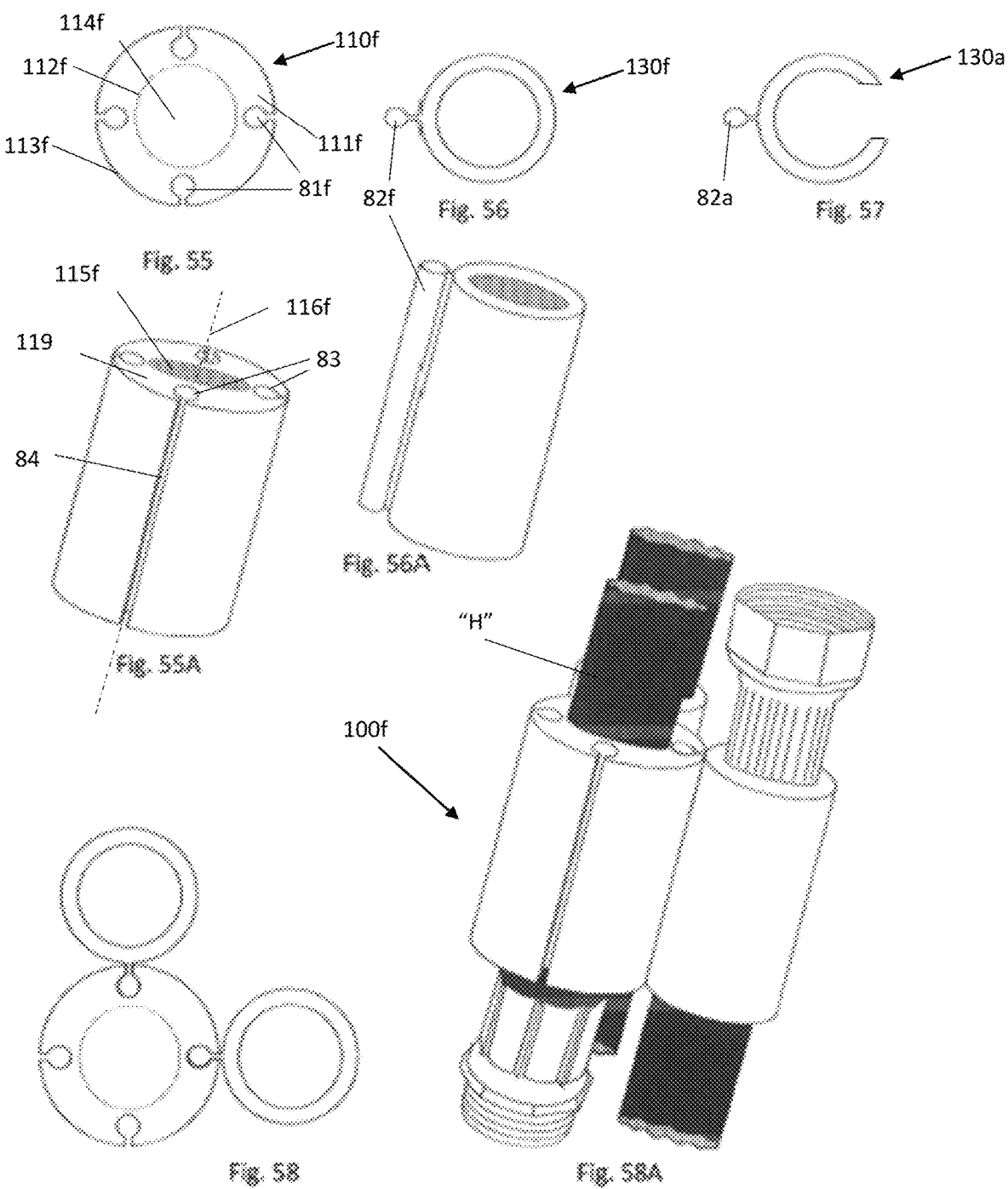

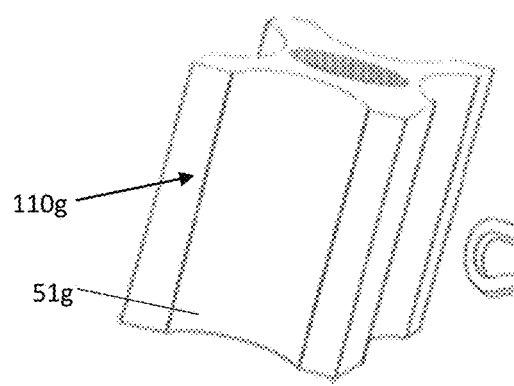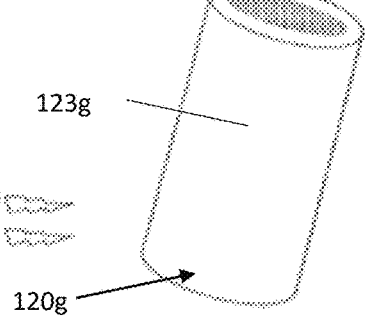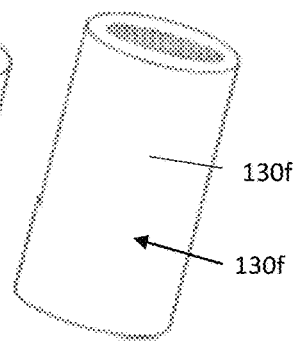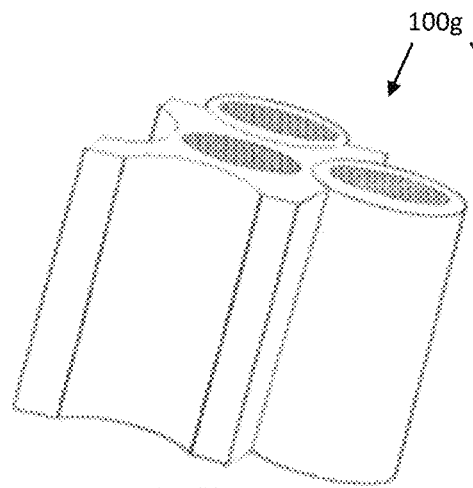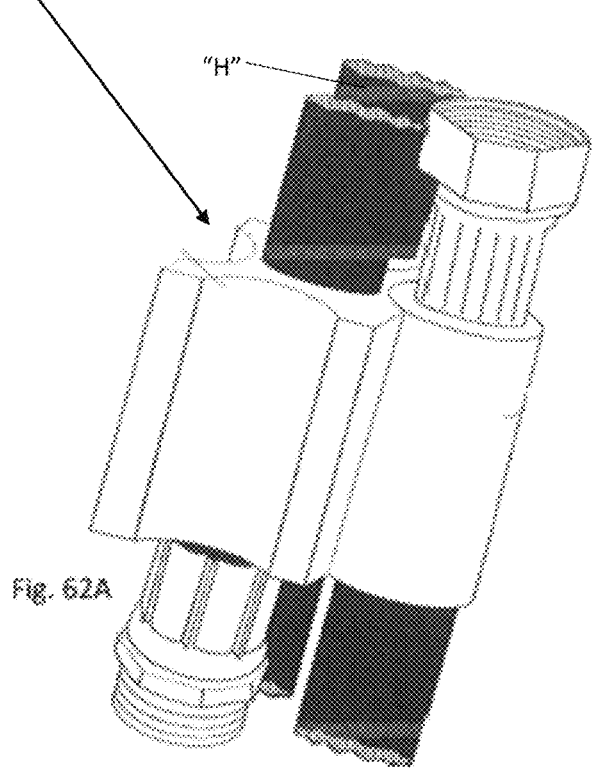

DEVICE FOR REEL-LESS SPOOLING OF HOSES, FLEXIBLE PIPES AND CABLES

CROSS-REFERENCE TO RELATED APPLICATION

The present application is a Continuation Application which claims the benefit of and priority to U.S. patent application Ser. No. 15/770,631, filed on Apr. 24, 2018, which is a U.S. National Stage application filed under 35 U.S.C. § 371(a) of International Patent Application Serial No. PCT/US18/027886, filed on Apr. 17, 2018, which claims the benefit of and priority to U.S. Provisional Patent Application Ser. No. 62/602,293, filed on Apr. 19, 2017, the entire content of which is incorporated herein by reference.

BACKGROUND

The present disclosure relates generally to organizing devices, and, more specifically, to a quick winding assistance device (Q.W.A.D.™), organizing devices which can connect to tubular structures, such as hoses, flexible pipes or conduits, cables, stiff ropes, and the like to facilitate spooling or winding thereof, and methods of using the same.

Technical Field

Exemplary aspects described herein relate generally to organizational devices, and, more particularly, to devices, systems, and methods that can connect to and assist with organizing (e.g., spooling or winding) elongate tubular structures (e.g., hoses, flexible pipes or conduits, cables, etc.), stiff ropes, and the like.

Related Art

Clamps, hose organizing systems, and cable ties are well known for connecting multiple tubular elements. For example, keeping a winded garden hose organized and rolled up.

So far, devices that connect multiple tubular elements are bulky or single use. Also, the connection can be complicated and time-consuming.

Accordingly, what is needed is a simple and effective way, using a quick winding assistance device (Q.W.A.D.™) to spool, wind and organize tubular elements.

SUMMARY

Existing challenges associated with the preceding, as well as other challenges, are overcome by methods for organizing tubular elements and also by systems, and apparatuses that operate by the methods.

According to an example embodiment herein, a winding assistance device for elongate tubular members is provided. The winding assistance device includes a first cuff including an elongate body defining a first cuff longitudinal axis, the elongate body of the first cuff having a C-shaped transverse cross-sectional profile defining a radially facing opening therealong, wherein the opening of the first cuff extends about 90°, wherein the opening of the first cuff defines a first cuff entry axis extending orthogonally from the first cuff longitudinal axis and bisecting a width of the opening of the first cuff.

The winding assistance device includes a second cuff including an elongate body defining a second cuff longitudinal axis, the elongate body of the second cuff having a C-shaped transverse cross-sectional profile defining a radially facing opening therealong, wherein the opening of the second cuff extends about 90°, wherein the opening of the second cuff defines a second cuff entry axis extending orthogonally from the second cuff longitudinal axis and bisecting a width of the opening of the second cuff.

The first cuff and the second cuff are secured to one another such that the first cuff entry axis is co-axial with the second cuff entry axis, and such that the opening of the first cuff and the opening of the second cuff face away from one another.

The elongate tubular member is selectively receivable in each of the first cuff and the second cuff via.

The winding assistance device may further include a third cuff including an elongate body defining a third cuff longitudinal axis, the elongate body of the third cuff having a C-shaped transverse cross-sectional profile defining a radially facing opening therealong, wherein the opening of the third cuff extends about 90°, wherein the opening of the third cuff defines a third cuff entry axis extending orthogonally from the third cuff longitudinal axis and bisecting a width of the opening of the third cuff. The third cuff may be secured to at least one of the first cuff and the second cuff such that the third cuff entry axis is orthogonal to at least one of the first cuff entry axis or the second cuff entry axis, and such that the opening of the third cuff faces away from the first cuff and the second cuff.

The winding assistance device may further include a third cuff including an elongate body defining a third cuff longitudinal axis, the elongate body of the third cuff having a C-shaped transverse cross-sectional profile defining a radially facing opening therealong, wherein the opening of the third cuff extends about 90°, wherein the opening of the third cuff defines a third cuff entry axis extending orthogonally from the third cuff longitudinal axis and bisecting a width of the opening of the third second cuff. The first cuff, the second cuff, and the third cuff may be secured to one another such that the first cuff entry axis, the second cuff entry axis and the third cuff entry axis are oriented about 120° relative to one another, and such that the opening of the first cuff, the opening of the second cuff, and the opening of the third cuff face away from one another.

The device may define at least one longitudinally extending connection channel formed in an outer surface thereof, at a location between the first cuff and the second cuff.

The winding assistance device may further include a third cuff including an elongate body defining a third cuff longitudinal axis, the elongate body of the third cuff having a C-shaped transverse cross-sectional profile defining a radially facing opening therealong, wherein the opening of the third cuff extends about 90°, wherein the opening of the third cuff defines a third cuff entry axis extending orthogonally from the third cuff longitudinal axis and bisecting a width of the opening of the third cuff, the third cuff including a connecting rib projecting from an outer surface thereof and extending in a longitudinal direction. The connecting rib of the third cuff may snap-fit connect the one connection channel of the winding assistance device to connect the third cuff to the first cuff and the second cuff.

A longitudinal axis of the connecting rib of the third cuff may be oriented orthogonal to the third cuff entry axis.

The at least one longitudinally extending connection channel formed in an outer surface of the winding assistance device may include a pair of connection channels, at a location between the first cuff and the second cuff, and on opposite sides of the winding assistance device.

The winding assistance device may further include a fourth cuff including an elongate body defining a fourth cuff longitudinal axis, the elongate body of the fourth cuff having a C-shaped transverse cross-sectional profile defining a radially facing opening therealong, wherein the opening of the fourth cuff extends about 90°, wherein the opening of the fourth cuff defines a fourth cuff entry axis extending orthogonally from the fourth cuff longitudinal axis and bisecting a width of the opening of the fourth cuff, the fourth cuff including a connecting rib projecting from an outer surface thereof and extending in a longitudinal direction. The connecting rib of the fourth cuff may snap-fit connect to one connection channel of the winding assistance device, opposite the third cuff, to connect the fourth cuff to the first cuff and the second cuff.

A longitudinal axis of the connecting rib of the fourth cuff may be oriented orthogonal to the fourth cuff entry axis.

The third cuff may be securable to at least one of the first cuff and the second cuff via a hook and loop fastener.

At least one of the first cuff or the second cuff may include a first polymeric fastener having a rectangular array of interlocking mushroom-shaped stems, and wherein the third cuff may include a second polymeric fastener having a rectangular array of interlocking mushroom-shaped stems, wherein the third cuff is selectively connectable to at least one of the first cuff or the second cuff via mating connection between the first polymeric fastener and the second polymeric fastener.

At least one of the first cuff, the second cuff or the third cuff may be constructed from the group of materials consisting of metals, polymers, resins, and plastics.

The first cuff may be selectively securable to the second cuff.

The first cuff may be constructed, at least partially, from a positively charged magnetic material; and the second cuff may be constructed, at least partially, from a negatively charged magnetic material. An outer surface of the first cuff may be magnetically attracted to an outer surface of the second cuff.

One of the first cuff or the second cuff may define a concave profile formed in the outer surface thereof.

The winding assistance device may further include a third cuff including an elongate body defining a third cuff longitudinal axis, the elongate body of the third cuff having a C-shaped transverse cross-sectional profile defining a radially facing opening therealong, wherein the opening of the third cuff extends about 90°, wherein the opening of the third cuff defines a third cuff entry axis extending orthogonally from the third cuff longitudinal axis and bisecting a width of the opening of the third cuff. The third cuff may be magnetically securable to at least one of the first cuff and the second cuff.

The third cuff may be constructed from a ferromagnetic material.

The first cuff may support a first magnet in the concave profile of an outer surface thereof; and the second cuff may support a second magnet in an outer surface thereof. The first magnet and the second magnet are arranged to attract the outer surface of the first cuff to the outer surface of the second cuff.

The winding assistance device may further include a first cover configured to retain the first magnet in a pocket formed in the outer surface of the first cuff; and a second cover configured to retain the second magnet in a pocket formed in the outer surface of the second cuff.

The first cover may extend along a length less than a full length of the first cuff.

According to a further aspect of the present disclosure, a hose assembly is provided. The hose assembly includes a hose including an elongate flexible tubular body defining a first end and a second end, a threaded male connector supported on the first end of the flexible tubular body, and a threaded female connector supported on the second end of the flexible tubular body.

The hose assembly includes a tubular connection hub including a hub body defining a lumen therethrough, and at least one connection recess formed in an outer surface thereof, wherein the tubular connection hub is pre-mounted on the tubular body of the hose such that the flexible tubular body of the hose extends through the lumen of the connection hub.

The hose assembly includes at least one connector including a connector body defining a lumen therethrough, and a connector projecting from an outer surface thereof and configured for snap-fit engagement with the connection recess of the connection hub, wherein each connector is pre-mounted on the tubular body of the hose such that the flexible tubular body of the hose extends through the lumen of the connector.

BRIEF DESCRIPTION OF THE DRAWINGS

FIGS. 15-18 are perspective views illustrating another embodiment of a winding device in accordance with the present disclosure.

FIGS. 19-20 are perspective views illustrating yet another embodiment of a winding device in accordance with the present disclosure.

FIGS. 21-26 are perspective views illustrating exemplary methods of use associated with the winding device of FIGS. 19-20.

FIGS. 32-34 are perspective views illustrating further embodiments of a winding device and magnetic elements in accordance with the present disclosure.

FIGS. 35-48 are perspective views illustrating embodiments of a winding device and magnetic elements in accordance with the present disclosure.

FIGS. 49-52 are perspective views illustrating embodiments of a system in accordance with the present disclosure.

FIGS. 55-58A are perspective views illustrating other embodiments of a winding device in accordance with the present disclosure.

FIGS. 59-62A are perspective views illustrating further embodiments of a winding device in accordance with the present disclosure.

DETAILED DESCRIPTION

Figure 1:
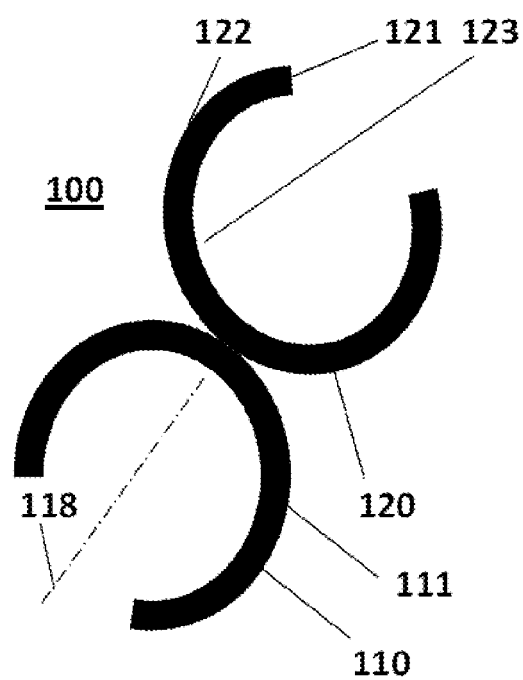
FIG. 1 is a schematic view of a winding device according to an embodiment of the present disclosure.
Figure 2:
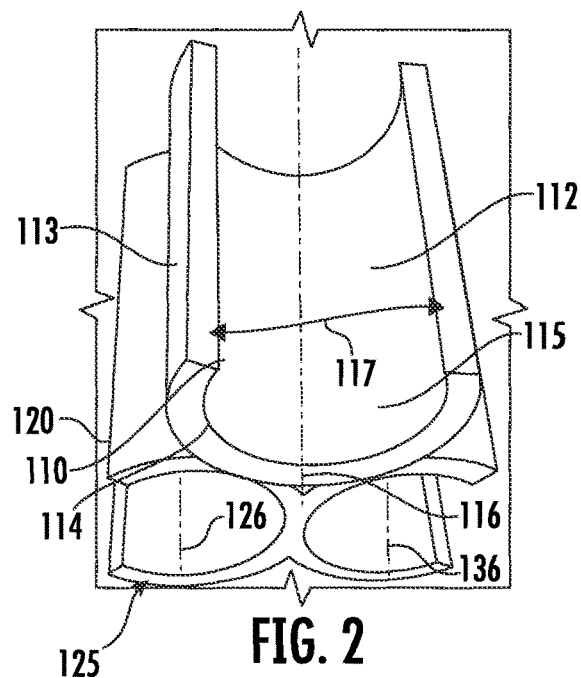
FIGS. 2, 3 and 3A are perspective views illustrating other embodiment of a winding device in accordance with the present disclosure.

Embodiments of the present disclosure are described in detail concerning the drawings, in which like reference numerals designate identical or corresponding elements in each of the several views.

The term "magnetic polarity" as used herein refers to the tendency of a metal to be attracted to other metals capable of being attracted via a magnetic charge.

Referring generally to FIGS. 1-14, and more particular to FIGS. 1-3A a quick winding assistance device (Q.W.A.D.™) for elongate tubular structures illustrated by label 100 is presented, hereafter "winding device." The winding device 100 includes a first cuff 110 and a second cuff 120 which are typically connected one another. The first cuff 110 has a cylindrical shape including a first body 111, curved inner surface 112, curved outer surface 113, top opening 114 defining a channel or central opening 115. The central opening 115 is disposed through the first body 111 and at the center thereof defining a first longitudinal axis 116.

First body 111 may be an elongate body having an approximately C-shaped transverse cross-sectional profile and defines a first radial opening 117 radially facing therealong. Radial opening 117 is configured to receive a tubular element therethrough. In embodiments, the first radial opening 117 of the first cuff 110 may extend about 90°. The first radial opening 117 of the first cuff 110 defines a first cuff entry axis 118 extending orthogonally from the first longitudinal axis 116 and bisecting the first radial opening 117. In embodiments, the first radial opening 117 may include optional retainers (not shown) which may be resilient and which may assist to secure a tubular element after being received via the first radial opening 117.

Second cuff 120 is connected to the first cuff 110. Second cuff 120 and first cuff 110 may connect via well-known in the art methods such as bonding via glue, epoxy, or any other suitable bonding element. Second cuff 120 and first cuff 110 may be manufactured separately (and then joined to one another), or together, via well-known in the art methods like extruding, 3D printing, casting, and the like. Similar to first cuff 110, second cuff 120 includes a second body 121, a second curved outer surface 122, a second curved inner surface 123, and an opening 124 defining a second channel or second central opening 125. The central opening 125 is disposed through the second body 121 and at the center thereof defining a second longitudinal or central axis 126.

Second body 121 may be an elongate body having a substantially C-shaped transverse cross-sectional profile and defines a second radial opening 127 radially facing therealong. The second radial opening 127 of the second cuff 120 may extend about 90°. The second radial opening 127 of the second cuff 120 defines a second cuff entry axis 128 extending orthogonally from the second longitudinal axis and bisecting the second radial opening 127.

Figure 3:
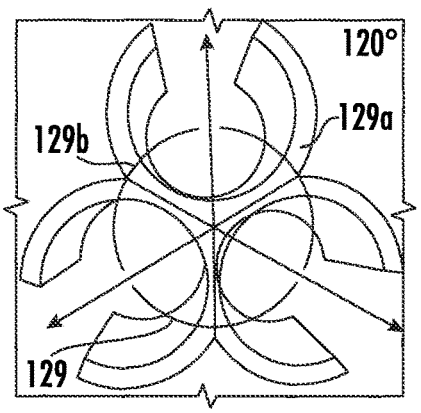
Figure 3A:
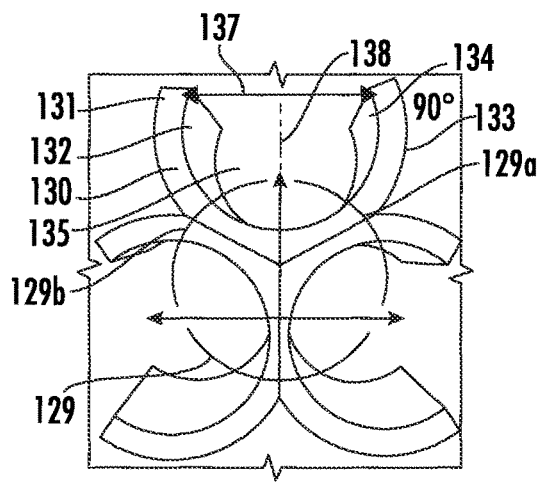
Figure 4:
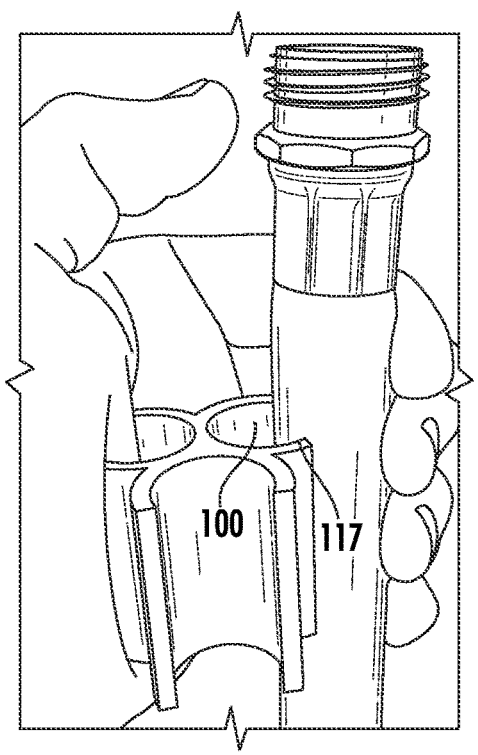
FIGS. 4-14 are perspective views illustrating exemplary methods of use associated with the winding device of FIGS. 1-3A.
Figure 5:
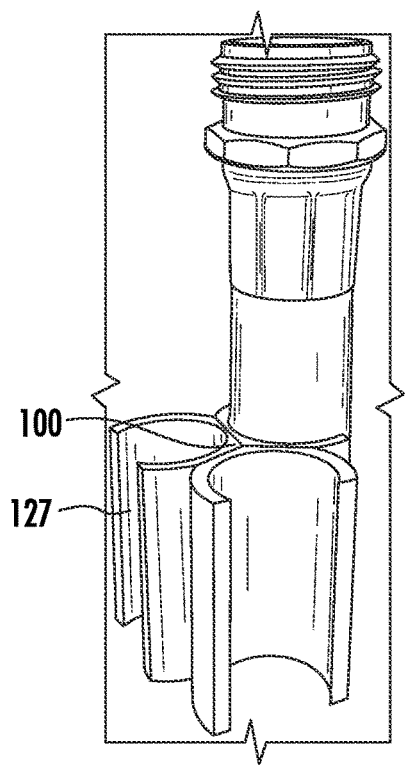
Figure 6:
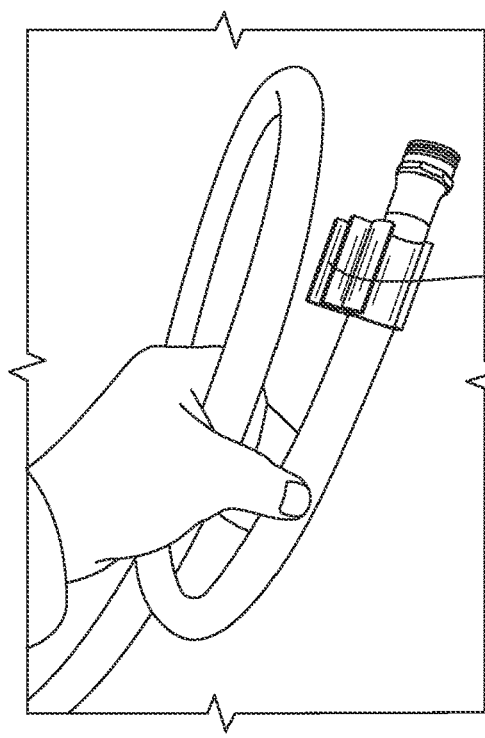
Figure 7:
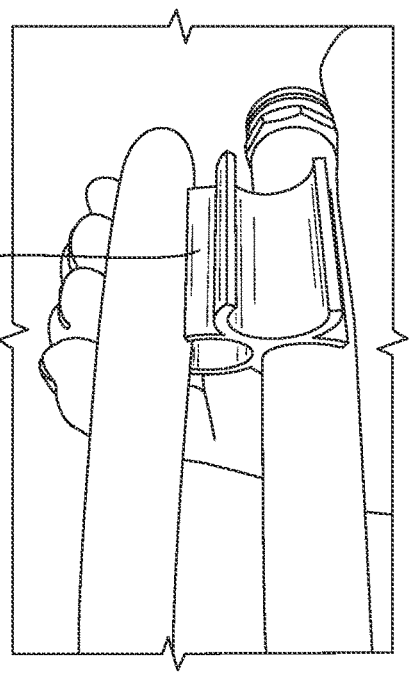
Figure 8:
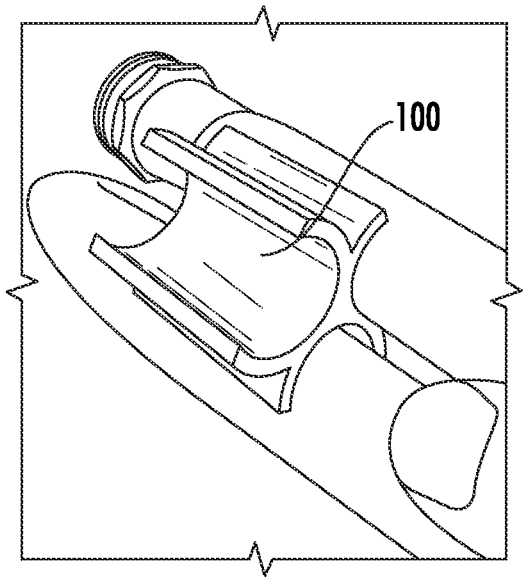

In embodiments, the first cuff 110 and second cuff 120 can be configured to oppose one another. More specifically, first cuff entry axis 118 is co-linear to the second cuff entry axis 128 ultimately forming an angle 129 of about 180 degrees (FIG. 3A). In embodiments, may be desired to have the first cuff entry axis 118 and the second cuff entry axis 128 configured in such a way where angle 129 is less or more than 180 agrees (FIG. 3).

Figure 9:
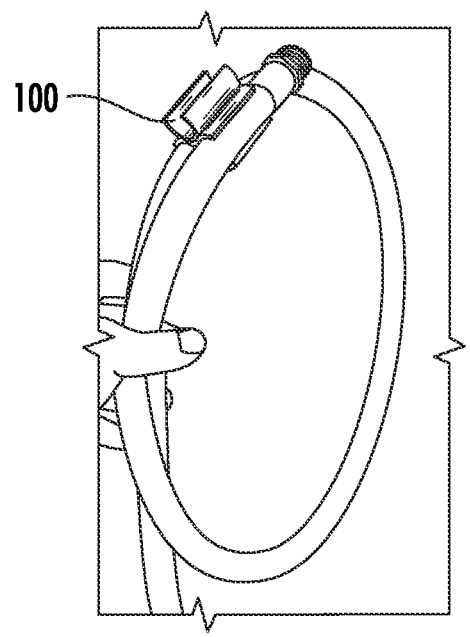
Figure 10:
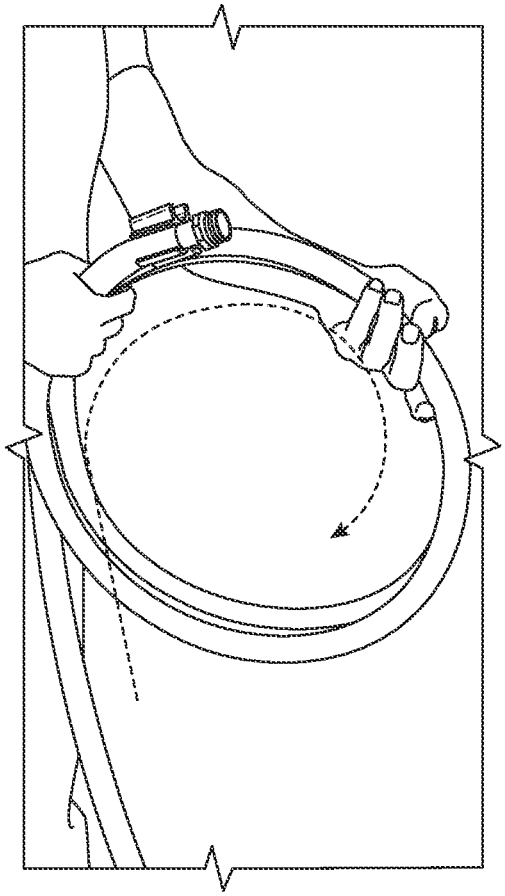
Figure 11:
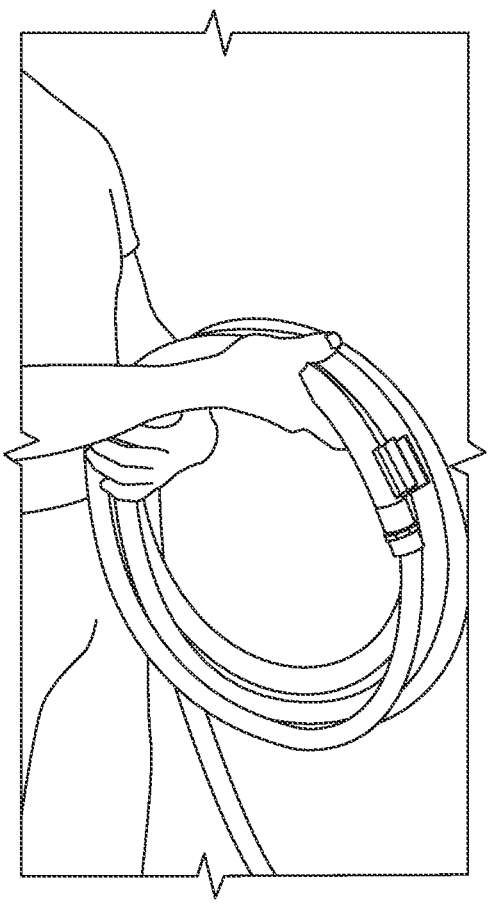
Figure 14:
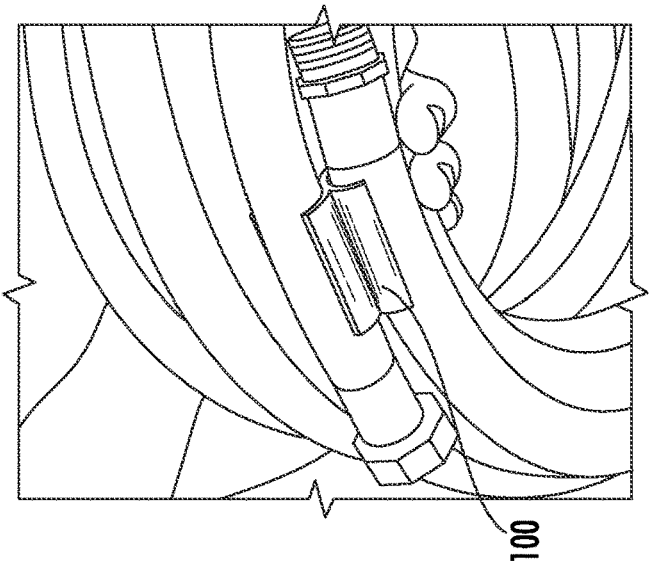
Figure 13:
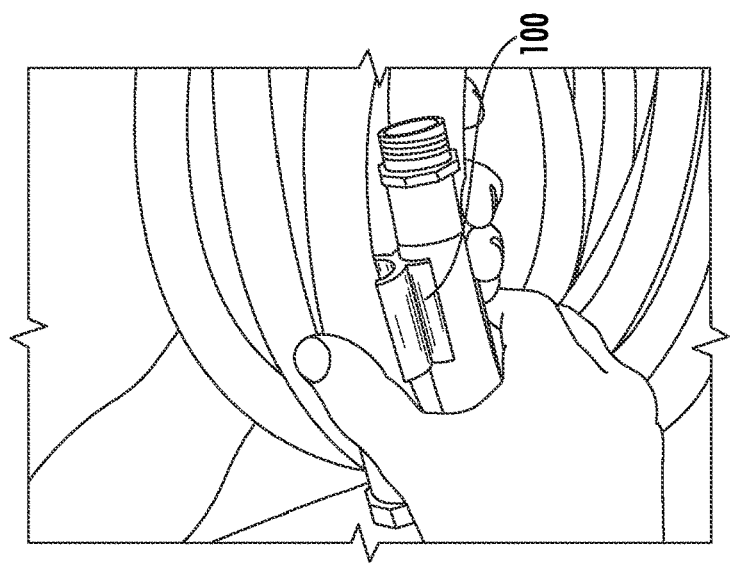
Figure 12:
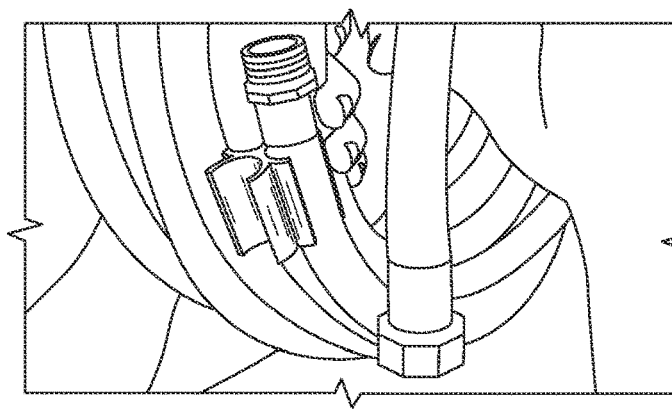
Figure 16:
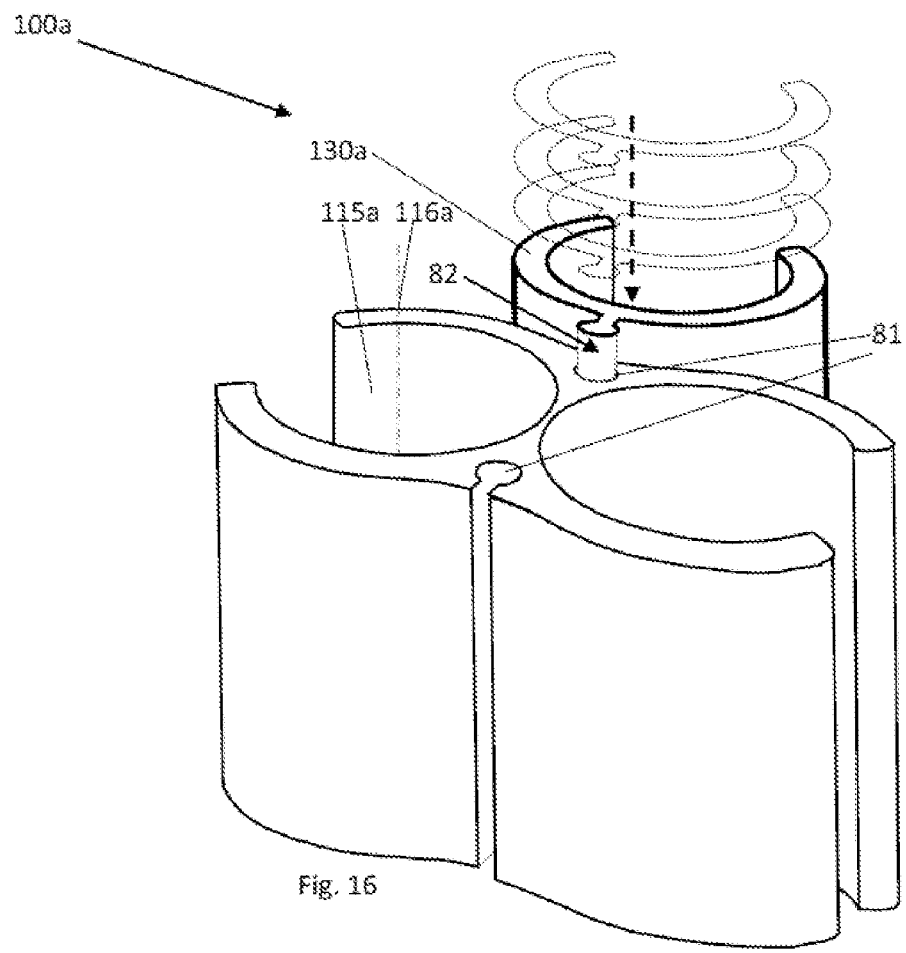
Figure 17:
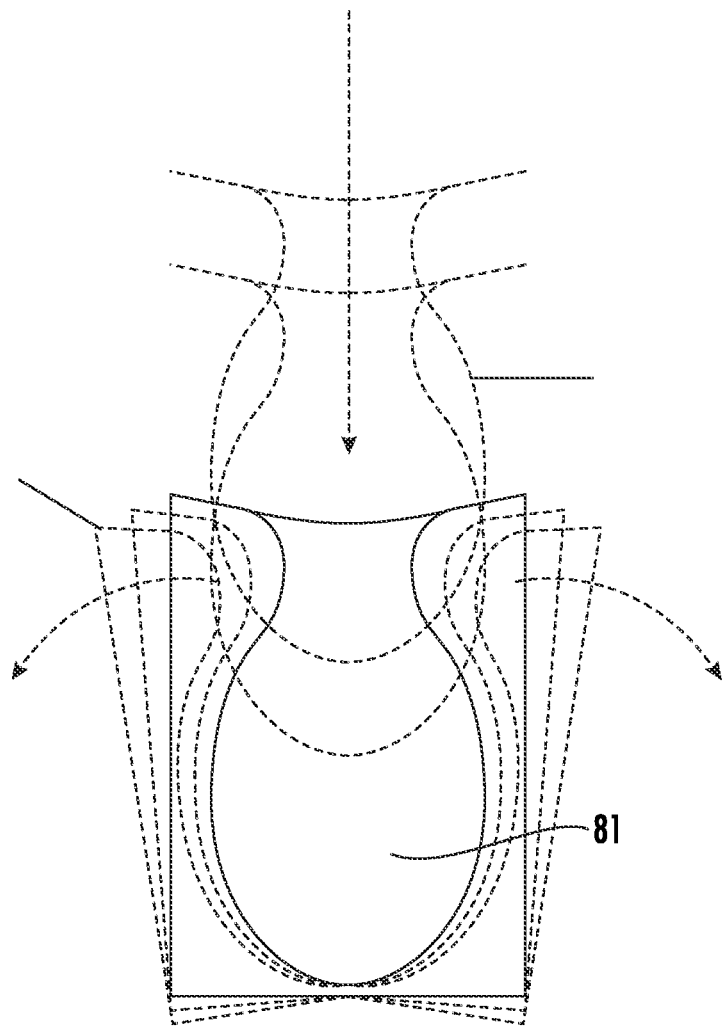
Figure 18:
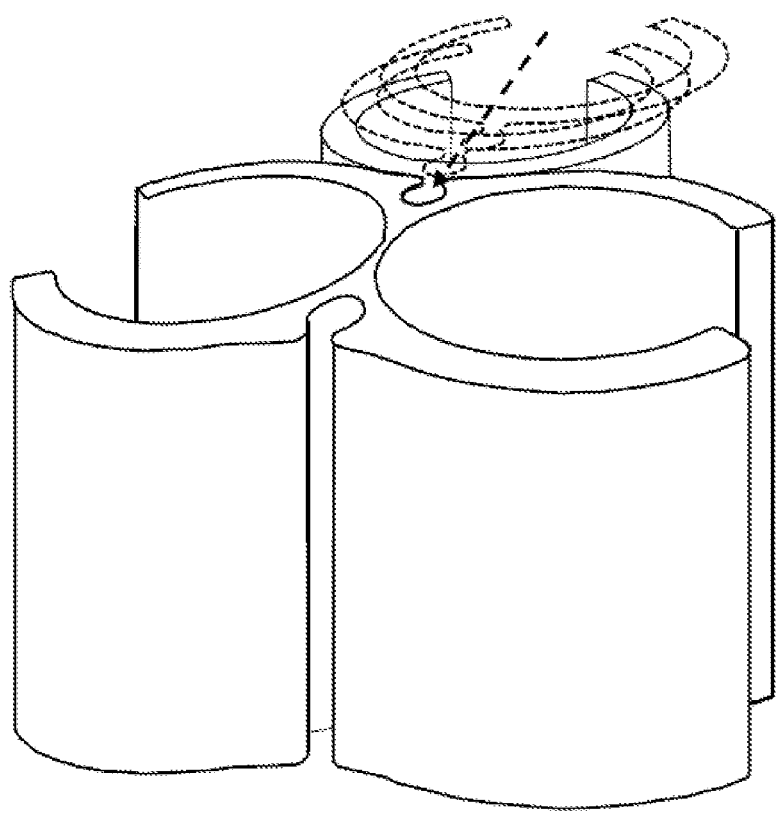
Figure 23:
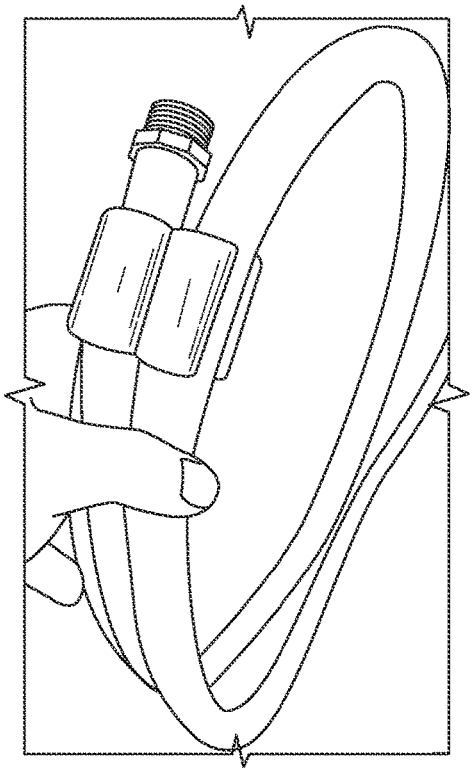

Now referring to FIGS. 4-14, the winding device 100 is configured to receive a tubular element and can further be configured to assist organizing a substantially elongated and flexible tubular member (e.g., hose, flexible pipe or conduit, cable, etc.). While in use, by way of example, a user may connect a first portion of a garden hose to the first cuff 110 (FIGS. 4-6) and ultimately connect a second portion of the garden hose to the second cuff 120 (FIGS. 9, 12, and 14). The user can connect the first cuff 110 and the second cuff 120 to selected portions of the garden hose via the central openings 115 and 125, after press-fitting each of the selected portions respectively through the first and second radial openings 115, 125.

In a second exemplary embodiment, the user may fasten the garden hose to the first cuff 110 and form a first connection (FIG. 5); wind the hose one time (FIG. 6) and then fasten the second cuff 120 to a selected portion of the hose (FIGS. 8-9) forming a second connection. In preferred embodiments, the user may form a first connection as described above and further from the second connection after winding the hose more than one time. Moreover, the number of times the user can wind the hose between connections is not limited by the winding device 100. On the other hand, the number of connections is corresponding to the number of cuffs.

Further, in embodiments, it may be desired to have the winding device 100 configured to include more than two cuffs. In an exemplary embodiment, a third cuff 130 selectively connects to first cuff 110 or the second cuff 120, or both at the same time. The third cuff 130 includes a third body 131, a third inner surface 132, a third outer surface 133, a third opening 134 defining a channel or a central opening 135. The central opening 135 defines a third central axis 136. Third body 131 may be an elongate body having a substantially C-shaped transverse cross-sectional profile and defines a second radial opening 137 radially facing therealong. The third radial opening 137 extends orthogonally away from the third central axis 136 while defining a third cuff entry axis 138. The third cuff 130 connects to the outer surfaces 112 and 122 and further defines a plurality of angles having equal or at least one different angle value. Examples, as seen in the exemplary embodiment of FIG. 3, angles 129, 129a, and 129b, are 120 degrees angles; or as seen in the exemplary embodiment of FIG. 3A angles 129a, and 129b are 90 degrees angles while angle 129 is a 120 degrees angle.

Third cuff 130, second cuff 120 and first cuff 110 may be manufactured separately (and then joined to one another), or together, via well-known in the art methods like extruding, 3D printing, casting, and the like.

Turning now to FIGS. 15-18, exemplary embodiments shown in FIGS. 15-18 depict a winding device 100a including a female connector 81 and a male connector 82. In general, winding device 100a includes at least three cuffs, with two of them, being opposed and connected to each other. The remaining cuff can be removably attached to the other two cuffs. For example, winding device 100a may include a female connector 81 positioned between a first cuff 110a and a second cuff 120a, and a male connector 82 protruding away from a third cuff 130a. In an exemplary embodiment, the female connector 81 is configured as a channel having a cross-sectional C-shape and dimensioned to receive the male connector 82 therethrough. The female and male connectors can be dimensioned to correspond one another. Additionally, the female connector 81 can be positioned substantially parallel to a first a central axis 116a defined by a first central opening 115a of the first connector 110a. On the other hand, the male connector 82 may protrude away from a third outer surface 133a of a third cuff 130a. In embodiments, the connectors 81 and 82 may be resilient. In general, the male connector 82 and the female connector 81 can be of any shape as long as the two portions are dimensioned and configured to form a secure connection when ultimately mated one another.

Figure 24:
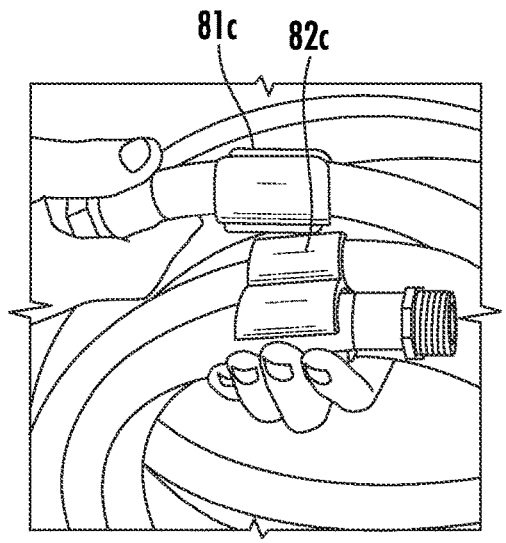
Figure 25:
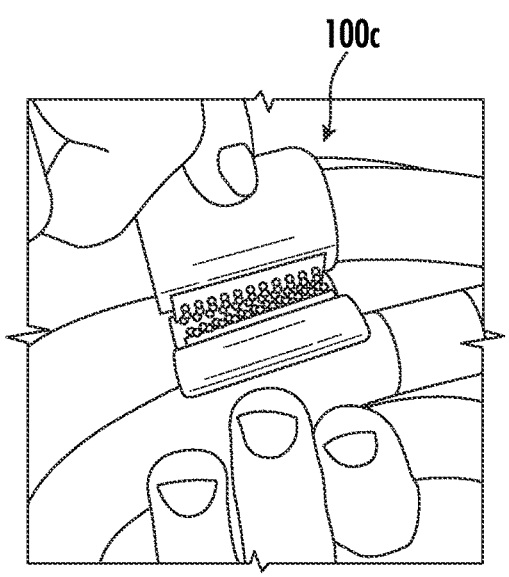
Figure 26:
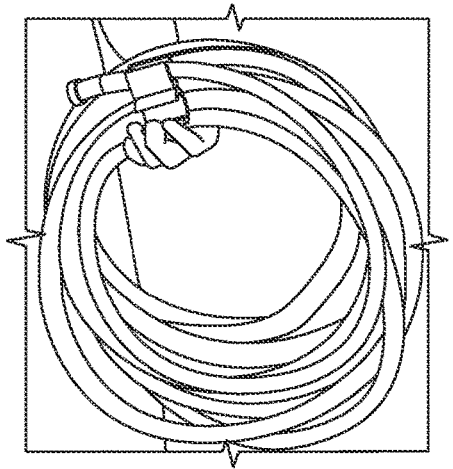

In one example, FIGS. 19-26 depict exemplary embodiments of a winding device 100c which is presented and configured to include a connecting hook and loop portions. More specifically as seen in FIGS. 19 and 20, a female connector 81c is disposed onto a connected first and second cuffs 110c, 120c. The male connector 82c is disposed onto the third cuff 130c. While in use, a user can connect a first and second portions of garden hose respectively to connected first and second cuffs 110c, 120c (FIG. 23) and further connect the third cuff 130c to a third portion of the garden hose (FIG. 24). Ultimately the user can fasten the third cuff 130c to the connected first and second cuffs 110c, 120c (FIG. 25) via connecting male portion 82c to female portion 81c. In preferred embodiments, the cuffs may include retaining groves 97 which may be dispose in inner surfaces 112c, 122c, and 132c.

Figure 27:
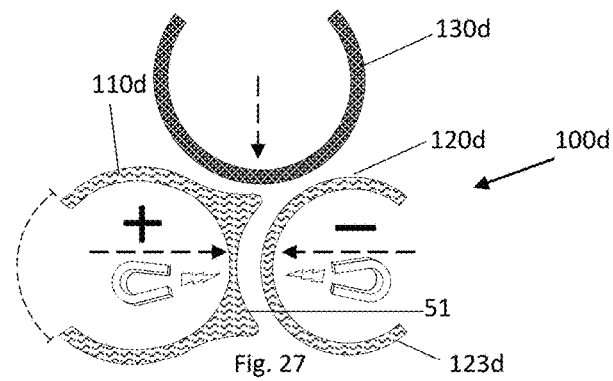
FIGS. 27 and 28 are top views illustrating embodiments of a winding device including magnetic characteristics in accordance with the present disclosure.
Figure 28:
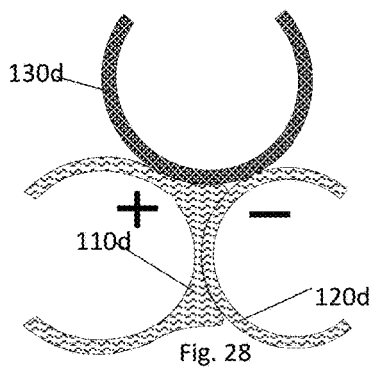
Figure 27A:
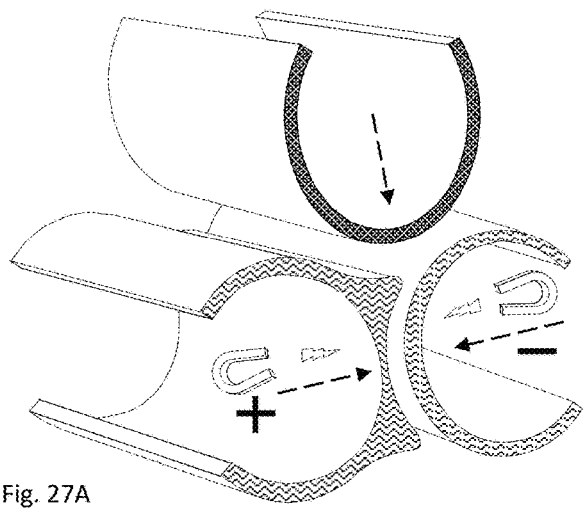
FIGS. 27A and 28A are perspective views illustrating additional embodiments of the winding device of FIGS. 27 and 28.
Figure 28A:
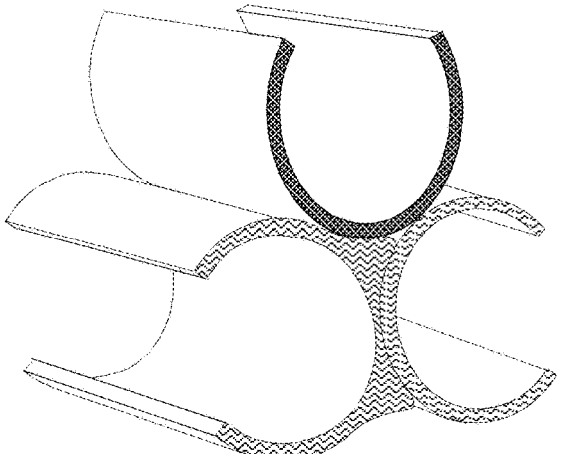
Figure 29:
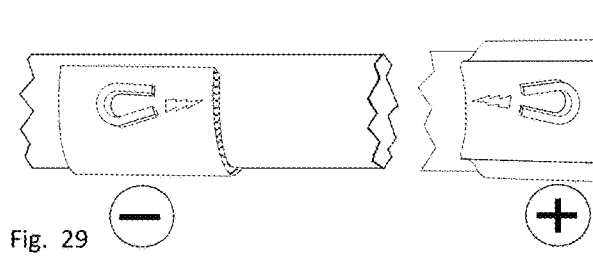
FIGS. 29-31 are perspective views illustrating methods of use associated with the winding device of FIGS. 27-28A.
Figure 30:
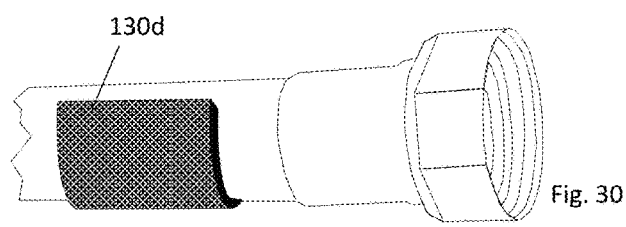
Figure 31:
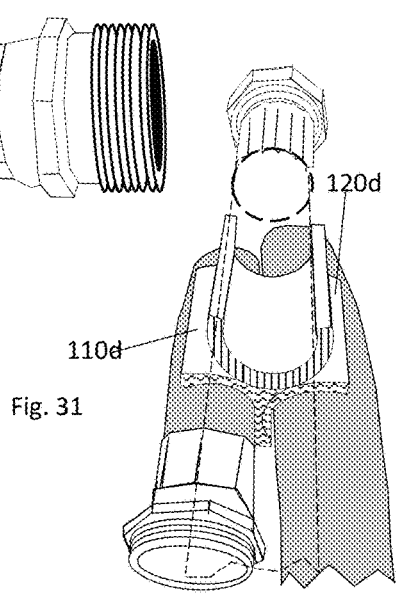
Figure 40:
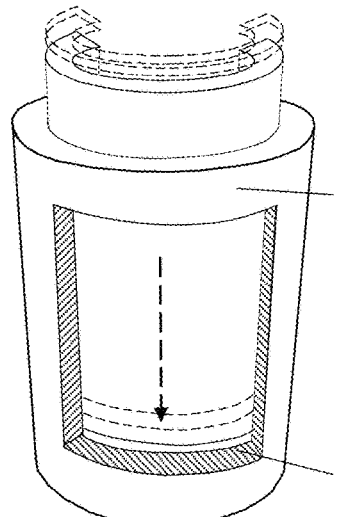
Figure 41:
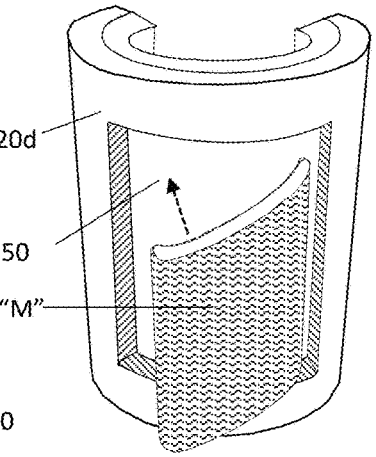
Figure 42:
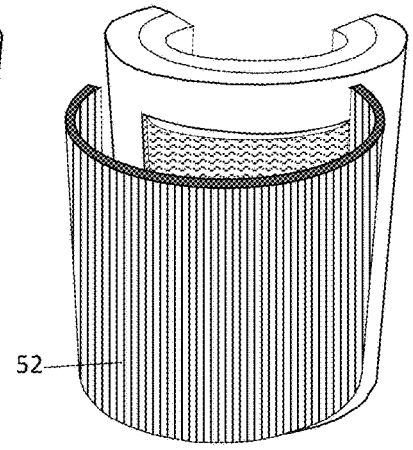
Figure 43:
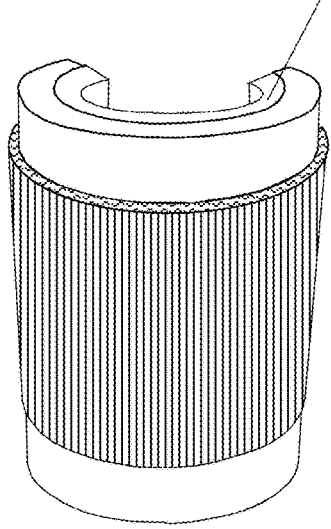
Figure 44:
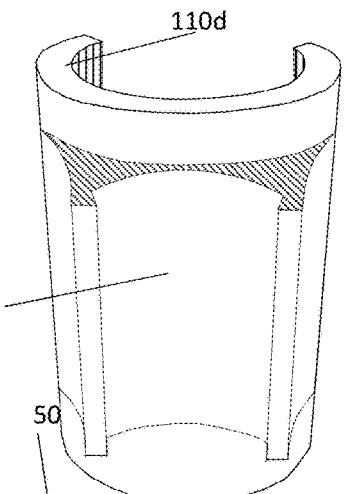
Figure 45:
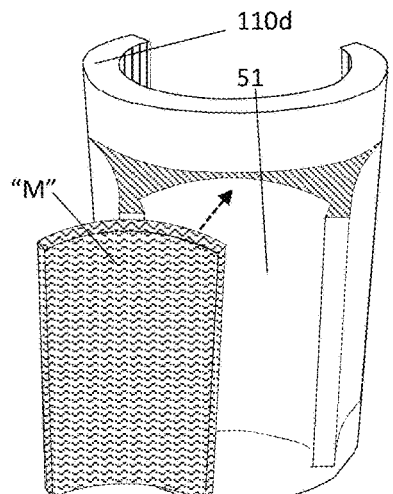
Figure 46:
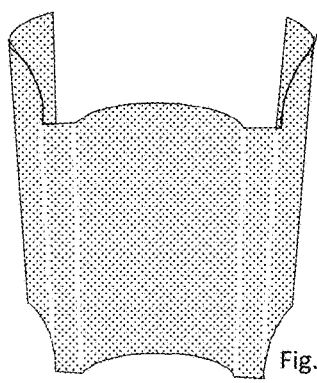
Figure 47:
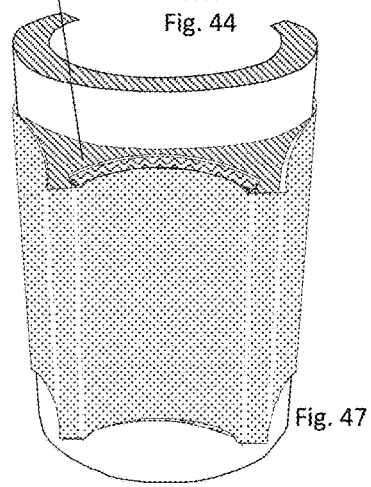
Figure 48:
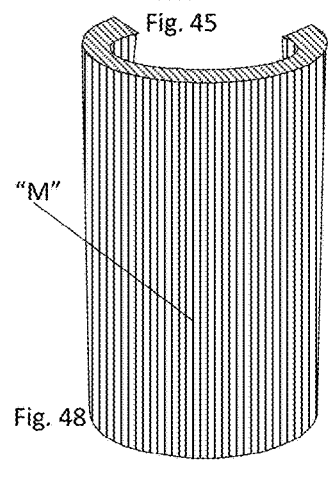

In another example, FIGS. 27-48 depict exemplary embodiments of a winding device 100d configured to include connecting portions which may be magnetically charged. In the first set of exemplary embodiments (FIGS. 32-48), at least two cuffs selected from cuffs 110d, 120d, or 130d may each include a magnetic element "M" received via an opening or pocket 50 which can be included in one or both selected cuffs. Alternatively, in selected embodiments, the magnetic element "M" may be embedded in at least one cuff during manufacturing. In the second set of exemplary embodiments (FIGS. 27-30), one of the cuffs may be at least partially manufactured using magnetic materials (e.g. iron, cobalt, nickel, aluminum, magnetite, ferromagnetic metals, or other suitable materials which can connect to a cuff having a magnetic polarity. In the third set of exemplary embodiments (FIGS. 35, 40, and 47), magnetic elements "M" may be fastened, glued or screwed onto selected cuffs. The selected polarity may be a positive polarity "+" configured to attract an element having an opposite polarity, e.g., a negative polarity "−". Thus, the polarities or charges "+" and "−" when included in cuffs 110d, 120d, 130d or the magnetic element "M" enables the cuffs to form a magnetic bond when connected one another, and form a tightly closed clip-like closure as seen in FIGS. 27-28a. It is understood that the cuffs 110d, 120d, and 130d can be configured to include coupling features or surfaces 52 (FIG. 42) or 53 (FIG. 43) that may assist with retaining a solid magnetic connection between cuffs. For example, while in use a user may connect a positive charged first cuff 110d to a first portion of a garden hose and a negative charged second cuff 120d to a second portion of a garden hose. In embodiments, the first cuff 120d may further include a curved portion 51 configured to reciprocally receive an outer surface 123d of the second cuff 120d (FIG. 29). Further, the user may couple the third cuff 130d to a third portion of a garden hose. Ultimately, the user can connect the third cuff 130d (manufactured of a ferromagnetic material) to the first and second cuff 110d, 120d (FIG. 31).

Figure 52:
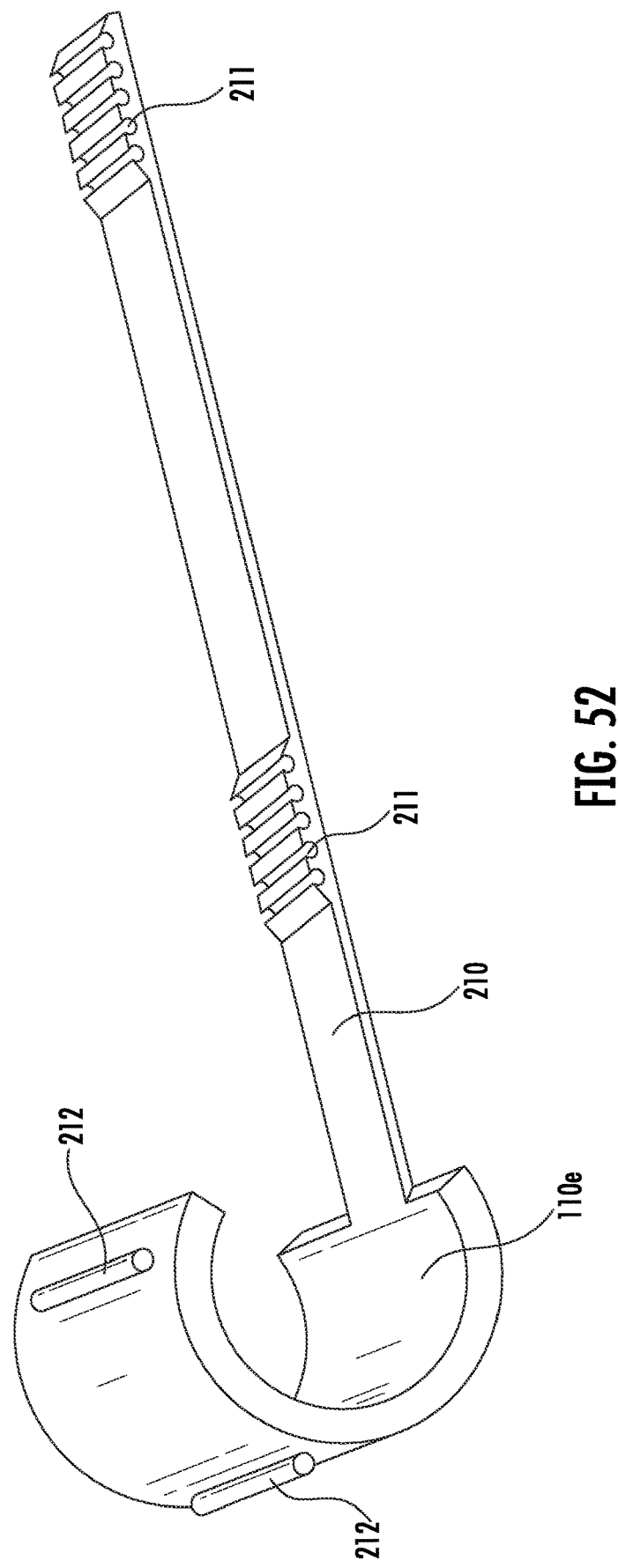

Referring now to FIGS. 49-52, a winding system 200 is presented, hereinafter "system 200". The winding system 200 including a fastener 210 hereinafter "fastener 210" connected to a first cuff 110e. The fastener 210 including a first end 214 and a second end 215. In general, the fastener 210 can be configured in varying sizes, shapes and colors, and may include features that may enable a secure connection to the first cuff 110e (FIGS. 49-51). Alternatively, it may be desired to have the fastener 210 manufactured pre-attached to the first cuff 110e (FIG. 52). In general, the fastener 210 is dimensioned to wrap around tubular element (FIGS. 51 and 54A) and includes connecting features that enable a secure attachment to the first cuff 110e. For example, the elongated fastener 210 may include connecting features such as a female connector 211 configured for attachment to a male connector 212 of the first cuff 110e. In exemplary embodiments shown in FIGS. 49 and 50, the female connector 211 is illustrated in the form of an opening disposed through the elongated fastener 210, and the male connector is illustrated in the form of a hook or protrusion 212. The female connector 211 may be respectively dimensioned to receive the protrusion 212 and ultimately secure the elongated fastener 210 to the first cuff 110e. In exemplary embodiments shown in FIG. 52, the female connector 211 is illustrated in the form of a plurality of channels disposed along the elongated fastener 210, and the male connector 212 is illustrated in the form of a corresponding protrusion protruding away from the first cuff 110e. In preferred embodiments, the system 200 may further include a tensioner 213 connected to a second end 215 of the faster 210 (FIGS. 49-51). The tensioner 213, when pulled from, may assist to disconnect or connect the faster 210 from the first cuff 110e.

Figures 53, 53A:
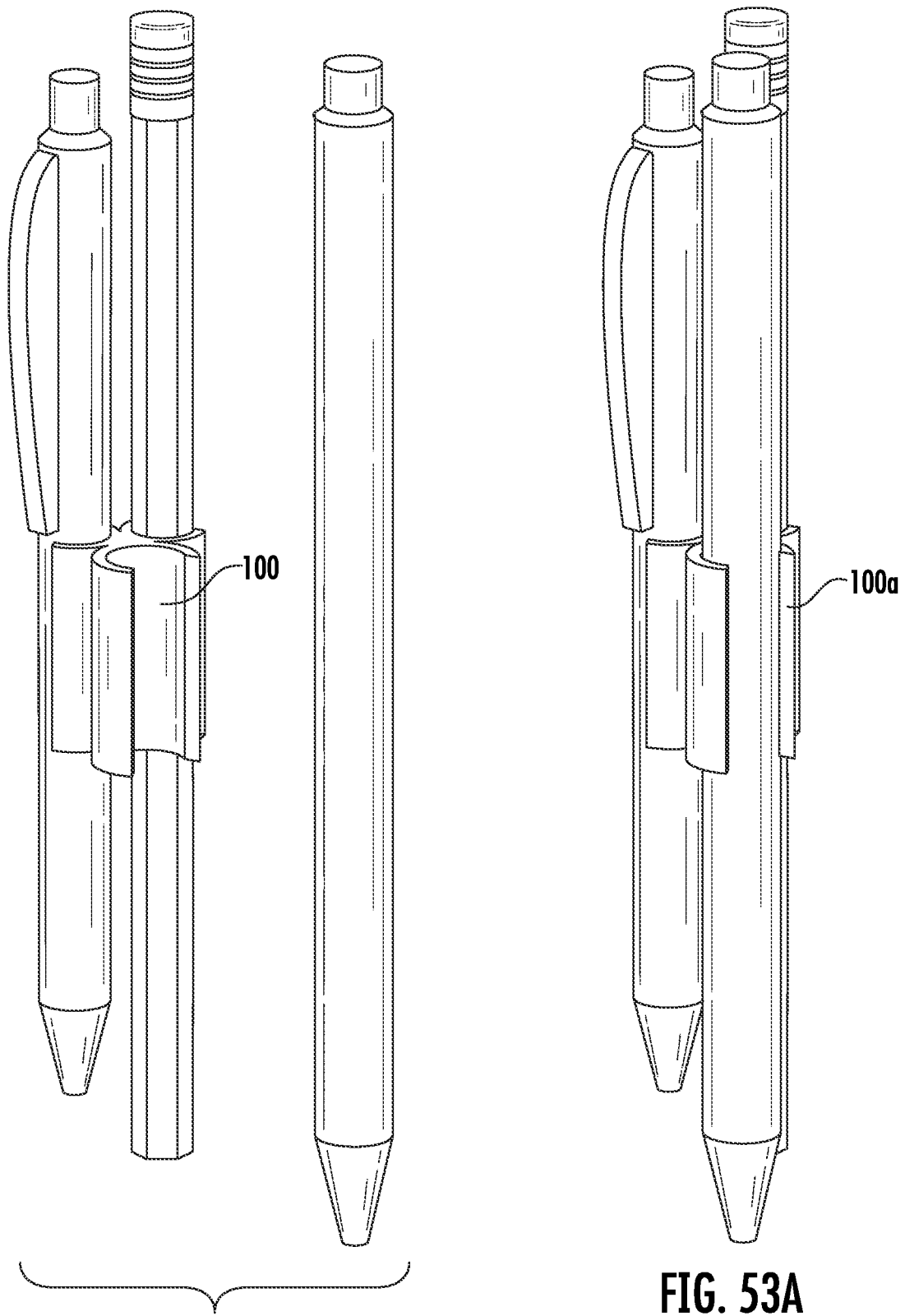
FIGS. 53 and 53A are perspective views illustrating exemplary methods of use associated with the winding device of FIGS. 1-3.
Figure 54A:
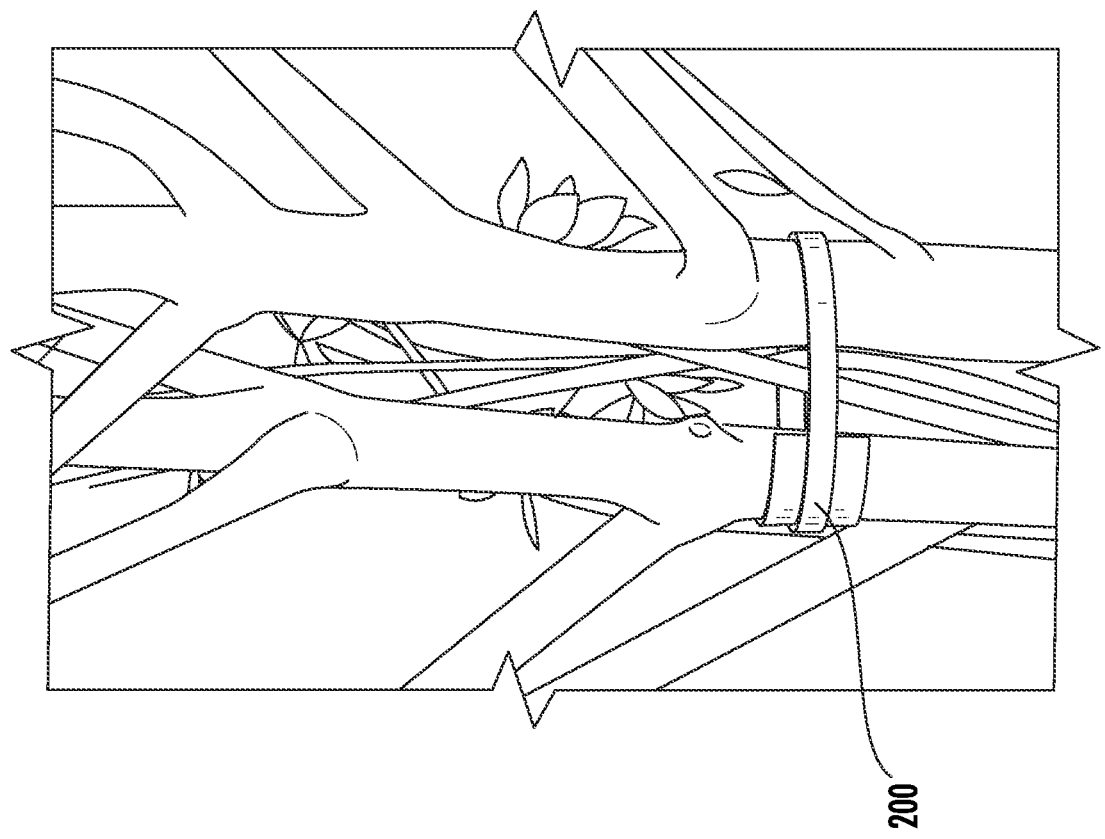
FIGS. 54 and 54A are perspective views illustrating exemplary methods of use associated with the winding system of FIGS. 49-52.
Figure 54:
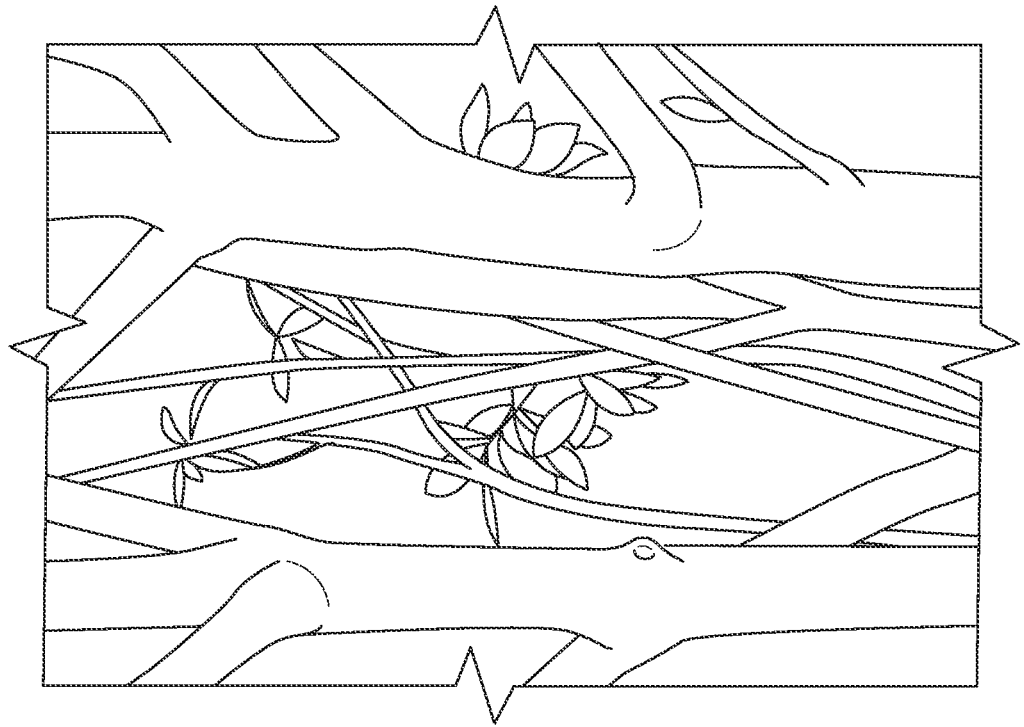

Turning now to FIGS. 53-54A. FIGS. 53-54A depict exemplary method of use of winding devices 100 and winding system 200. In one exemplary embodiment, the winding device 100 can be configured to organized pens, pencils, or the like as seen in FIGS. 53 and 53A. In a different exemplary embodiment, winding system 200 can be configured to be attached to a tree.

Now referring to FIGS. 55-58A. FIGS. 55-58A depict exemplary embodiments where a winding device 100f is configured to include a first cuff or hub 110f and at least one, third cuff 130a (mentioned above) or a cuff 130f. The hub 110f includes a hub body 111f including curved inner surface 112f, curved outer surface 113f, top opening 114f defining a channel or central opening 115f. The top opening 114f is disposed on a top surface 119 of the hub body 111f and defines a first longitudinal axis 116f. The hub body 111f includes a plurality of openings 81f which are radially disposed about the central axis 116f. The plurality of openings 81f defines elongated channels 83 which extend along the hub body 81f parallelly to the central axis 116f. The elongated channels 83 are configured to receive the male connector 82a of the third cuff 130a or a male connector 82f of the cuff 130f. In embodiments, the cuff 130f and/or the hub 110f may be pre-attached to a tubular structure "H" such as a first garden hose. In embodiments, the elongated channel 83f can be configured as a channel having a cross-sectional C-shape further defining an opening 84 extending along the hub body 111f. While in use, a user can connect the third cuff 130a or the cuff 130f to the hub 110f by sliding the male connector 82f or the connector 82a into one of the channel 83 following the direction of the central axis 116f Alternatively, a user can connect the third cuff 130a or the cuff 130f to the hub 110f by press fitting (orthogonally to the axis 116f) the male connector 82f or the connector 82a into one of the channel 83.

With reference to FIGS. 59 to 62A. FIGS. 59 to 62A depict exemplary embodiments where a winding device 100g is configured including a first cuff 110g and a second cuff 120g, the first cuff 110g including at least one connecting surface 51g. It is understood that the first cuff 110g can be configured as a magnetic hub including a plurality of connecting surfaces 51g and it may be pre-mounted on a tubular structure "H" (e.g. the body of the hose). In embodiments, at least one of the connecting surfaces 51g of the first cuff 110g may be configured in such way that a secure magnetic connection is formed between the connecting surfaces 51g and the second cuff 120g. More specifically, the first and second cuff 110f, 120g can be configured to include connecting portions which may be positive or negative charged similar to the exemplary embodiments described above in FIG. 27-48. Further, the second cuff 120g may further include an outer surface 123g which can be configure to include a shape corresponding to the shape of connecting surfaces 51g. For example, in an exemplary embodiment depicted in FIG. 62a the first cuff includes connecting surface 51g having a substantially curved C-shape which corresponds to the shape of outer surface 123g of the second cuff 120f.

It will be understood that various modifications may be made to the embodiments described by the present disclosure. Therefore, the above description should not be construed as limiting, but merely as exemplifications of embodiments. Those skilled in the art will envision other modifications within the scope and spirit of the present disclosure.

What is claimed is:

1. A winding assistance device for elongate tubular members, the winding assistance device comprising:
    a first cuff including an elongate body defining a first cuff longitudinal axis, the elongate body of the first cuff having a C-shaped transverse cross-sectional profile defining a radially facing opening therealong, wherein the opening of the first cuff extends about 90°, wherein the opening of the first cuff defines a first cuff entry axis extending orthogonally from the first cuff longitudinal axis and bisecting a width of the opening of the first cuff;
    a second cuff including an elongate body defining a second cuff longitudinal axis, the elongate body of the second cuff having a C-shaped transverse cross-sectional profile defining a radially facing opening therealong, wherein the opening of the second cuff extends about 90°, wherein the opening of the second cuff defines a second cuff entry axis extending orthogonally from the second cuff longitudinal axis and bisecting a width of the opening of the second cuff; and
    a third cuff including an elongate body defining a third cuff longitudinal axis, the elongate body of the third cuff having a C-shaped transverse cross-sectional profile defining a radially facing opening therealong, wherein the opening of the third cuff extends about 90°, wherein the opening of the third cuff defines a third cuff entry axis extending orthogonally from the third cuff longitudinal axis and bisecting a width of the opening of the third cuff, the third cuff including a connecting rib projecting from an outer surface thereof and extending in a longitudinal direction;
    wherein the first cuff and the second cuff are secured to one another such that the first cuff entry axis is co-axial with the second cuff entry axis, and such that the opening of the first cuff and the opening of the second cuff face away from one another;
    wherein the elongate tubular member is selectively receivable in each of the first cuff and the second cuff;
    wherein the device defines at least one longitudinally extending connection channel formed in an outer surface thereof, at a location between the first cuff and the second cuff; and
    wherein the connecting rib of the third cuff snap-fit connects the one connection channel of the winding assistance device to connect the third cuff to the first cuff and the second cuff.

2. The winding assistance device according to claim 1, wherein the first cuff, the second cuff, and the third cuff are secured to one another such that the first cuff entry axis, the second cuff entry axis and the third cuff entry axis are oriented about 120° relative to one another, and such that the opening of the first cuff, the opening of the second cuff, and the opening of the third cuff face away from one another.

3. The winding assistance device according to claim 1, wherein a longitudinal axis of the connecting rib of the third cuff is oriented orthogonal to the third cuff entry axis.

4. The winding assistance device according to claim 1, wherein the opening of each cuff defines a diameter, and wherein each cuff defines a length that is greater than the diameter of the opening thereof.

5. The winding assistance device according to claim 1, wherein the opening of each cuff defines a diameter, and wherein each cuff defines a length that is greater than the diameter of the opening thereof.

6. The winding assistance device according to claim 3, wherein the at least one longitudinally extending connection channel formed in an outer surface of the winding assistance device includes a pair of connection channels, at a location between the first cuff and the second cuff, and on opposite sides of the winding assistance device;
    the winding assistance device further comprising:
    a fourth cuff including an elongate body defining a fourth cuff longitudinal axis, the elongate body of the fourth cuff having a C-shaped transverse cross-sectional profile defining a radially facing opening therealong, wherein the opening of the fourth cuff extends about 90°, wherein the opening of the fourth cuff defines a fourth cuff entry axis extending orthogonally from the fourth cuff longitudinal axis and bisecting a width of the opening of the fourth cuff, the fourth cuff including a connecting rib projecting from an outer surface thereof and extending in a longitudinal direction;
    wherein the connecting rib of the fourth cuff snap-fit connects to one connection channel of the winding assistance device, opposite the third cuff, to connect the fourth cuff to the first cuff and the second cuff.

7. The winding assistance device according to claim 6, wherein the opening of each cuff defines a diameter, and wherein each cuff defines a length that is greater than the diameter of the opening thereof.

8. The winding assistance device according to claim 6, wherein a longitudinal axis of the connecting rib of the fourth cuff is oriented orthogonal to the fourth cuff entry axis.

9. A winding assistance device for elongate tubular members, the winding assistance device comprising:
    a first cuff including an elongate body defining a first cuff longitudinal axis, the elongate body of the first cuff having a C-shaped transverse cross-sectional profile defining a radially facing opening therealong, wherein the opening of the first cuff extends about 90°, wherein the opening of the first cuff defines a first cuff entry axis extending orthogonally from the first cuff longitudinal axis and bisecting a width of the opening of the first cuff;
    a second cuff including an elongate body defining a second cuff longitudinal axis, the elongate body of the second cuff having a C-shaped transverse cross-sectional profile defining a radially facing opening therealong, wherein the opening of the second cuff extends about 90°, wherein the opening of the second cuff defines a second cuff entry axis extending orthogonally from the second cuff longitudinal axis and bisecting a width of the opening of the second cuff; and a third cuff including an elongate body defining a third cuff longitudinal axis, the elongate body of the third cuff having a C-shaped transverse cross-sectional profile defining a radially facing opening therealong, wherein the opening of the third cuff extends about 90°, wherein the opening of the third cuff defines a third cuff entry axis extending orthogonally from the third cuff longitudinal axis and bisecting a width of the opening of the third cuff;

wherein the first cuff and the second cuff are secured to one another such that the first cuff entry axis is co-axial with the second cuff entry axis, and such that the opening of the first cuff and the opening of the second cuff face away from one another;

wherein the third cuff is secured to at least one of the first cuff and the second cuff such that the third cuff entry axis is orthogonal to at least one of the first cuff entry axis or the second cuff entry axis, and such that the opening of the third cuff faces away from the first cuff and the second cuff;

wherein the elongate tubular member is selectively receivable in each of the first cuff and the second cuff; and wherein the third cuff is securable to at least one of the first cuff and the second cuff via a hook and loop fastener.

10. A winding assistance device for elongate tubular members, the winding assistance device comprising:

a first cuff including an elongate body defining a first cuff longitudinal axis, the elongate body of the first cuff having a C-shaped transverse cross-sectional profile defining a radially facing opening therealong, wherein the opening of the first cuff extends about 90°, wherein the opening of the first cuff defines a first cuff entry axis extending orthogonally from the first cuff longitudinal axis and bisecting a width of the opening of the first cuff, the first cuff is constructed, at least partially, from a positively charged magnetic material; and a second cuff including an elongate body defining a second cuff longitudinal axis, the elongate body of the second cuff having a C-shaped transverse cross-sectional profile defining a radially facing opening therealong, wherein the opening of the second cuff extends about 90°, wherein the opening of the second cuff defines a second cuff entry axis extending orthogonally from the second cuff longitudinal axis and bisecting a width of the opening of the second cuff, the second cuff is constructed, at least partially, from a negatively charged magnetic material;

wherein the first cuff is selectively securable to the second cuff;

wherein the first cuff and the second cuff are secured to one another such that the first cuff entry axis is co-axial with the second cuff entry axis, and such that the opening of the first cuff and the opening of the second cuff face away from one another;

wherein the elongate tubular member is selectively receivable in each of the first cuff and the second cuff;

wherein an outer surface of the first cuff is magnetically attracted to an outer surface of the second cuff; and wherein one of the first cuff or the second cuff defines a concave profile formed in the outer surface thereof.

11. The winding assistance device according to claim 10, further comprising:

a third cuff including an elongate body defining a third cuff longitudinal axis, the elongate body of the third cuff having a C-shaped transverse cross-sectional profile defining a radially facing opening therealong, wherein the opening of the third cuff extends about 90°, wherein the opening of the third cuff defines a third cuff entry axis extending orthogonally from the third cuff longitudinal axis and bisecting a width of the opening of the third cuff;

wherein the third cuff is magnetically securable to at least one of the first cuff and the second cuff.

12. The winding assistance device according to claim 11, wherein the third cuff is constructed from a ferromagnetic material.

13. The winding assistance device according to claim 10, wherein:

the first cuff supports a first magnet in the concave profile of an outer surface thereof; and the second cuff supports a second magnet in an outer surface thereof;

wherein the first magnet and the second magnet are arranged to attract the outer surface of the first cuff to the outer surface of the second cuff.

* * * * *